United States Patent
Ebrahimi Afrouzi

(10) Patent No.: US 10,912,981 B1
(45) Date of Patent: Feb. 9, 2021

(54) TENNIS PLAYING ROBOTIC DEVICE

(71) Applicant: Ali Ebrahimi Afrouzi, San Jose, CA (US)

(72) Inventor: Ali Ebrahimi Afrouzi, San Jose, CA (US)

(73) Assignee: AI Incorporated, Toronto (CA)

( * ) Notice: Subject to any disclaimer, the term of this patent is extended or adjusted under 35 U.S.C. 154(b) by 5 days.

(21) Appl. No.: 16/247,630

(22) Filed: Jan. 15, 2019

Related U.S. Application Data

(60) Provisional application No. 62/618,157, filed on Jan. 17, 2018.

(51) Int. Cl.
*A63B 69/38* (2006.01)

(52) U.S. Cl.
CPC .......... *A63B 69/38* (2013.01); *A63B 2225/50* (2013.01)

(58) Field of Classification Search
None
See application file for complete search history.

(56) References Cited

U.S. PATENT DOCUMENTS

| | | | |
|---|---|---|---|
| 6,755,072 B1* | 6/2004 | Kanemitsu | A63B 60/42 73/11.01 |
| 10,112,076 B2 | 10/2018 | DeCarlo | |
| 2003/0181265 A1* | 9/2003 | Raiss | A63B 69/38 473/422 |
| 2014/0038751 A1 | 2/2014 | Yeager | |
| 2016/0310817 A1* | 10/2016 | Yeager | A63B 69/406 |

FOREIGN PATENT DOCUMENTS

| | | |
|---|---|---|
| CN | 103272376 A | 6/2013 |
| CN | 104474683 B | 12/2014 |
| CN | 104474697 B | 12/2014 |
| JP | 2008036383 A | 8/2006 |
| JP | 3133142 U | 3/2007 |
| WO | WO-2009084087 A1 * | 7/2009 ............. A63B 69/40 |

OTHER PUBLICATIONS

Machine translation of WO-2009084087 by google patents.*

* cited by examiner

*Primary Examiner* — James S. McClellan
*Assistant Examiner* — Peter J Iannuzzi

(57) ABSTRACT

Provided is a tennis playing robotic device including: a chassis; a set of wheels; one or more motors to drive the wheels; one or more processors; one or more sensors; one or more arms pivotally coupled to the chassis; and one or more tennis rackets, each of the one or more tennis rackets being coupled to a terminal end of a corresponding arm of the one or more arms.

20 Claims, 3 Drawing Sheets

TENNIS PLAYING ROBOTIC DEVICE

CROSS-REFERENCE TO RELATED APPLICATIONS

This application claims the benefit of Provisional Patent Application No. 62/618,157, filed Jan. 17, 2018, which is hereby incorporated by reference.

In this patent, certain U.S. patents, U.S. patent applications, or other materials (e.g. articles) have been incorporated by reference. Specifically, U.S. application Ser. Nos. 15/272,752, 15/949,708, 16/048,179, 16/048,185, 16/163,541, 16/163,562, 16/163,508, 16/185,000, 62/681,965, 16/109,617, 16/051,328, 15/449,660, 16/041,286, 15/406,890, 14/673,633, 62/746,688, 62/740,573, 62/740,580, 15/955,480, 15/425,130, 15/955,344, 15/048,827, 16/198,393, 15/981,643, 15/986,670, 62/664,389, 15/447,450, 15/447,623, 62/665,942, 62/617,589, 62/620,352, 15/951,096, 16/130,880, 14/859,748, and 16/230,805 are hereby incorporated by reference. The text of such U.S. Patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE DISCLOSURE

This disclosure relates to mobile robotic devices and specifically to mobile robotic devices that teach and play tennis.

BACKGROUND

Mobile robotic devices are becoming increasingly prevalent in home and work environments. For example, mobile robotic devices have been integrated within consumer homes to automate cleaning of the consumer homes. In other instances, mobile robotic devices have been integrated within manufacturing warehouses to automate at least a portion of a manufacturing process of a device. In several cases, mobile robotic devices are beneficial for the convenience they provide in automating one or more tasks that otherwise would require human intervention. An example includes sports training, wherein a person often requires at least one opponent to train in a particular sport. In such instances, a mobile robotic device capable of playing sports can eliminate the need for the at least one opponent.

SUMMARY

The following presents a simplified summary of some embodiments of the techniques described herein in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Some aspects provide a tennis playing robotic device including: a chassis; a set of wheels; one or more motors to drive the wheels; one or more processors; one or more sensors; one or more arms pivotally coupled to the chassis; and one or more tennis rackets, each of the one or more tennis rackets being coupled to a terminal end of a corresponding arm of the one or more arms.

DETAILED DESCRIPTION OF SOME EMBODIMENTS

Figure 1:
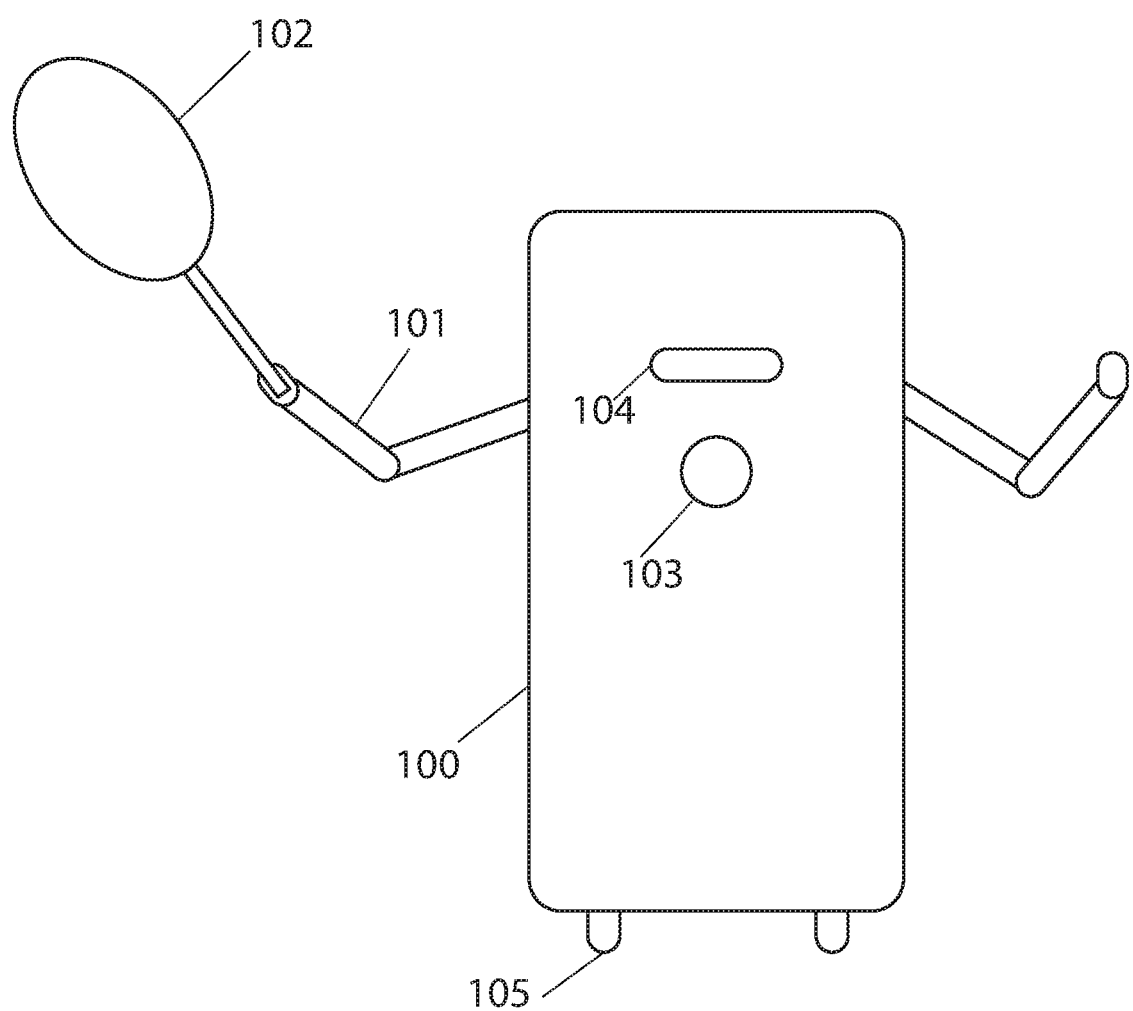
FIG. 1 illustrates an example of a tennis playing robot according to some embodiments.

The present inventions will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present invention may be practiced without some or all of these specific details. In other instances, well known process steps and/or structures have not been described in detail in order to not unnecessarily obscure the present invention. Further, it should be emphasized that several inventive techniques are described, and embodiments are not limited to systems implanting all of those techniques, as various cost and engineering trade-offs may warrant systems that only afford a subset of the benefits described herein or that will be apparent to one of ordinary skill in the art.

Some embodiments provide a tennis playing robotic device. In some embodiments, the robotic device includes, but is not limited to include, a set of wheels, a power source, a chassis, a suspension system, a rechargeable battery, an actuator, a control module, and a processor. Examples of wheels of a robotic device are described in U.S. Patent Application No. 62/664,389, 15/447,450, 15/447,623, and 62/665,942, the entire contents of which are hereby incorporated by reference. Examples of a suspension system are described in U.S. Patent Application Nos. 62/617,589, 62/620,352, and Ser. No. 15/951,096, the entire contents of which are hereby incorporated by reference. In some embodiments, the robotic device further includes one or more arms and one or more detachable tennis rackets, each coupled to one of the one or more arms. In some embodiments, the robotic device further includes one or more tennis ball launchers. In some embodiments, the robotic device further includes a user interface for, for example, adjusting settings, choosing functions, scheduling tasks. In some embodiments, the robotic device further includes a mapping module for mapping the environment using mapping methods such as those described in U.S. patent application Ser. Nos. 16/048,179, 16/048,185, 16/163,541, 16/163,562, 16/163,508, 16/185,000, and 62/681,965, the entire contents of which are hereby incorporated by reference. In some embodiments, the robotic device further includes a localization module for localizing the robotic device using localization methods such as those described in U.S. Patent Application Nos. 62/746,688, 62/740,573, 62/740,580, Ser. Nos. 15/955,480, 15/425,130, and 15/955,344 the entire contents of which are hereby incorporated by reference. In some embodiments, the robotic device further includes a path planning module to determine optimal movement paths of the robotic device based on the tasks of the robotic device using path planning methods such as those described in U.S. patent application Ser. Nos. 16/041,286, 15/406,890, and 14/673,633, the entire contents of which are hereby incorporated by reference. In some embodiments, the robotic device includes a scheduling module for setting a schedule of the robotic device using scheduling methods such as those described in U.S. patent application Ser. Nos. 16/051,328 and 15/449,660, the entire contents of which are hereby incorporated by reference. In some embodiments, the robotic device includes sensors such as cameras, LIDAR sensors, LADAR sensors, stereo imaging sensors, optical sensors, imaging sensors, distance sensors, acoustic sensors, motion sensors, obstacle sensors, cliff sensors, floor sensors, debris sensors, time-of-flight sensors, depth sensors, signal transmitters and receivers, signal strength sensor, gyroscope, optical encoders, optical flow sensors, GPS, and other types of sensors. In some embodiments, the robotic device includes a wireless module to wirelessly send and receive information, such as a Wi-Fi module or a Bluetooth module. In some embodiments, the robotic device includes an acoustic sensor to receive verbal commands.

In some embodiments, the one or more robotic arms include two or more links pivotally coupled to one another. In some embodiments, the one or more robotic arms have similar range of motion as a shoulder and an elbow of an average person. In some embodiments, a first link of each of the one or more arms is pivotally coupled to the chassis on a first end and has similar range of motion as a shoulder of an average person, a first end of a second link is pivotally coupled to a second end of the first link and has similar range of motion as an elbow of an average person, and a third link is pivotally coupled to a second end of the second link and has similar range of motion as a write of an average person. For example, the first link of each of the one or more arms pivotally coupled to the chassis has a 150 degree lateral range of motion (i.e., arm lifting to the side of the chassis, like a flapping motion) relative to a position of the arm when against a side of the chassis (e.g., like an arm of a human hanging loosely at the side of a body); 190 degree flexion range of motion (i.e., arm lifting in front of the chassis) relative to a position of the arm when against a side of the chassis; 60 degree extension range of motion (i.e., arm lifting behind the chassis) relative to a position of the arm when against a side of the chassis; and a 90 degree lateral and medial rotation range of motion (i.e., the first link rotating behind and in front of the chassis when the first link is lifted to the side of the chassis at 90 degrees) relative to a position of the arm when the first link is lifted to the side of the chassis at 90 degrees.

In some embodiments, each of the one or more detachable tennis rackets is coupled to the third link of one of the one or more arms. In some embodiments, the one or more arms include only the first and second links described above and each of the one or more detachable tennis rackets is coupled to the second link of one of the one or more arms. In some embodiments, a tennis ball hitting speed and direction of each of the one or more tennis rackets is adjustable. In some embodiments, the processor of the robotic device autonomously adjusts the tennis ball hitting speed and direction of each of the one or more tennis rackets based on the success of the opponent in returning the balls within an area of the court. In some embodiments, the processor of the robotic device autonomously adjusts the tennis ball hitting speed and direction of each of the one or more tennis rackets based on preprogrammed routines. For example, different preprogrammed routines target specific techniques or provide different difficulty level. In some embodiments, the tennis ball hitting speed is adjusted and the direction is fixed or vice versa. In some embodiments, both the tennis ball hitting speed and direction are adjusted. In some embodiments, particular tennis racket settings, such as tennis ball hitting speed and direction, are chosen using an interface of the robotic device or an application of a communication device coupled with the robotic device.

In some embodiments, one or more processors of the robotic device actuate movement of the one or more arms based on a position of the tennis ball, a position of an opponent and a target location on an opposing end of a tennis court. In some embodiments, the target location on the opposing end of the tennis court depends on a difficulty level setting of the tennis playing robotic device. In some embodiments, the speed of movement of the one or more arms depends on the difficulty level setting of the tennis playing robotic device. In some embodiments, the one or more processors actuate movement of the tennis playing robotic device based on the position of the tennis ball. In some embodiments, the tennis playing robotic device is configured to hit the tennis ball with the one or more tennis rackets at a predetermined success rate. In some embodiments, the success rate is the percentage of tennis balls that successfully hit an area within the opposing side of the tennis court that is inbounds (the inbounds area changes depending on if the game is a singles or doubles match). In some embodiments, the predetermined success rate depends on the difficulty level setting of the tennis playing robotic device.

In some embodiments, each of the one or more tennis ball launchers are coupled to one of the one or more arms. In some embodiments, the one or more tennis ball launchers are coupled to the robotic device chassis. In some embodiments, the one or more tennis ball launchers are detachable from the robotic device. In some embodiments, a tennis ball launching speed and direction of each of the one or more tennis ball launchers is adjustable. In some embodiments, the processor of the robotic device autonomously adjusts the tennis ball launching speed and direction of each of the one or more tennis ball launchers based on the success of the opponent in returning the balls within an area of the court. In some embodiments, the processor of the robotic device autonomously adjusts the tennis ball launching speed and direction of each of the one or more tennis ball launchers based on preprogrammed routines. For example, different preprogrammed routines target specific techniques or provide different difficulty level. In some embodiments, the tennis ball launching speed is adjusted and the tennis ball direction is fixed or vice versa. In some embodiments, both the tennis ball launching speed and direction are adjusted. In some embodiments, particular tennis ball launcher settings, such as tennis ball launching speed and direction, are chosen using an interface of the robotic device or an application of a communication device coupled with the robotic device.

In some embodiments, a first arm of the one or more arms of the robotic device holds and throws a tennis ball and second arm of the one or more arms includes a tennis racket. In some embodiments, the robotic device serves. In some embodiments, different attachments (e.g., tennis racket, tennis ball, tennis ball launcher, etc.) can be coupled and de-coupled from at least one of the one or more arms depending on the desired function of the robotic device.

In some embodiments, one or more sensors of the robotic device, such as imaging sensors or motion sensors, are used to detect a position of a tennis ball, lines on a tennis court, and an opponent during play. In some embodiments, one or more motors control the speed and movement of the one or more arms and subsequently the tennis ball hitting speed and direction. In some embodiments, the processor of the robotic device actuates the robotic device to adjust the speed and movement of the one or more arms by adjusting the speed of the one or more motors. In some embodiments, one or more motors control the speed and direction of the one or more tennis ball launchers. In some embodiments, the processor of the robotic device actuates the robotic device to adjust the speed and direction of the one or more tennis ball launchers by adjusting the speed of the one or more motors.

In some embodiments, an interface of the robotic device, an application (e.g., software, mobile application, web application, etc.) of a communication device (e.g., smart phone, tablet, desktop, specialized computer, etc.) or another device paired with the robotic device is used to adjust settings, functions, and a schedule of the robotic device. An example of a pairing method of an application of a communication device and a robotic device is described in U.S. patent application Ser. No. 16/109,617, the entire contents of which is hereby incorporated by reference. Settings can include, for example, a particular or maximum tennis ball hitting speed, a tennis ball hitting direction, a particular or maximum tennis ball launching speed, a tennis ball launching direction, a difficulty level, a preprogrammed routine, a position of the robotic device (e.g., net or back court), a maximum travel speed of the robotic device, etc. Functions can include, for example, play singles tennis game, play doubles tennis game, singles rally, doubles rally, or launch tennis balls. A schedule can include, for example, one or more particular functions at a particular time and location for a particular user. An example of a graphical user interface of an application of a communication device that can be used to adjust settings, user preferences, and functions of a robotic device is described in U.S. patent application Ser. Nos. 15/272,752 and 15/949,708, the entire contents of which are hereby incorporated by reference. Examples of scheduling methods for robotic devices are described in U.S. patent application Ser. Nos. 16/051,328 and 15/449,660, the entire contents of which are hereby incorporated by reference.

In some embodiments, the robotic device autonomously parks in a parking or storage area until it is requested for a particular function at a particular time and location, at which point the robotic device autonomously navigates to the particular location at the particular time, just as described in U.S. patent application Ser. No. 16/230,805, the entire contents of which is hereby incorporated by reference. In some embodiments, a user requests a tennis playing robotic device using the application of the communication device, as described in U.S. patent application Ser. No. 16/230,805, the entire contents of which is hereby incorporated by reference.

In some embodiments, a profile of one or more users is stored within a memory of the robotic device. In some embodiments, the processor of the robotic device loads settings (e.g., difficulty level, maximum tennis ball speed, tennis ball launching speed, etc.) and history (e.g., different preprogrammed routines completed, number of playing hours, etc.) of one of the one or more users when the respective profile is selected using an interface of the robotic device or an application of a communication device paired with the robotic device.

In some embodiments, the processor of the robotic device uses machine learning to determine the optimal playing or training settings for a particular user. In some embodiments, the processor of the robotic device stores performance statistics recorded for both the robotic device and the particular user during each playing or training session with the particular user, including, for example, tennis ball speed, number of balls that are hit outside the court, number of balls hit within the court, number of balls returned, locations of where balls hit the court, number of successful serves, etc. In some embodiments, the processor of the robotic devise uses a Markov Decision Process (MDP) including states, actions, and rewards, to determine optimal settings of the robotic device. In a MDP, the robotic device takes an action to transition from one state to another and receives a reward after the transition based on the outcome of the action. In some embodiments, the processor of the robotic device chooses the settings that maximizes the total reward received. In some embodiments, optimal settings chosen result in the best performance statistics of the robotic device. In some embodiments, optimal settings result in the worst performance statistics of the particular user, as those are the areas of the game the particular user performs the most poorly at and needs to improve in. In some embodiments, the optimal settings chosen result in the best performance statistics of the robotic device and the worst performance statistics of the particular user. Examples of reinforcement learning methods, such as MDP, that may be applied herein are described in U.S. patent application Ser. Nos. 14/859,748, 16/230,805, 16/041,286, and 16/198,393, the entire contents of which are hereby incorporated by reference.

In some embodiments, the chassis of the robotic device is a customizable versatile robotic device chassis, such as the versatile robotic device chassis described in U.S. patent application Ser. No. 16/230,805, the entire contents of which is hereby incorporated by reference. In some embodiments, the versatile robotic chassis is customized to provide the tennis playing capabilities described herein. In some embodiments, the versatile robotic chassis is customized to provide capabilities for other sports, such as basketball, hockey, soccer, etc. In some embodiments, the versatile robotic chassis includes different attachments for different sports that can be switched out with one another depending on the desired function of the robotic device.

In some embodiments, two or more tennis playing robotic devices collaborate. For example, two tennis playing robotic devices collaborate to play a doubles match against two users. Examples of methods for collaboration of robotic devices are described in U.S. patent application Ser. Nos. 16/130,880, 15/981,643, 15/986,670, 15/048,827, and 16/185,000 the entire contents of which are hereby incorporated by reference.

FIG. 1 illustrates an example of a tennis playing robotic device 100 with arms 101, tennis racket 102, tennis ball launcher 103, sensors 104 and wheels 105 according to some embodiments. Arms 101 include three links, a first link pivotally coupled to robotic device 100, a second link pivotally coupled to the first link and a third link pivotally coupled to the second link. In some instances, the first, second, and third links have a similar range of motion to a human shoulder, elbow, and wrist, respectively. In some cases, the links of arms 101 can retract and expand.

Figure 2:
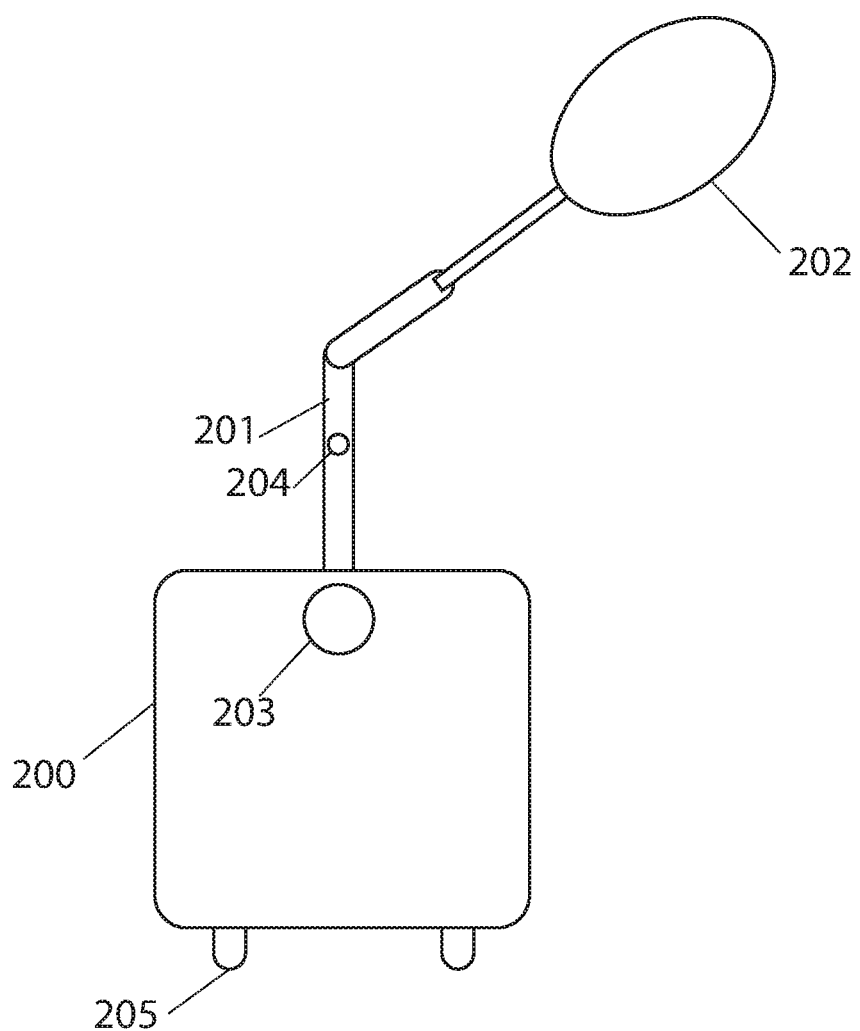
FIG. 2 illustrates an example of a tennis playing robot according to some embodiments.

FIG. 2 illustrates an example of a tennis playing robotic device 200 with arm 201, tennis racket 202, tennis ball launcher 203, sensors 204 and wheels 205 according to some embodiments. Arm 201 includes two links, a first link pivotally coupled to robotic device 200, a second link pivotally coupled to the first link. In some instances, the second link has 360-degree range of motion in all three planes. In some cases, the links of arm 201 can retract and expand.

Figure 3:
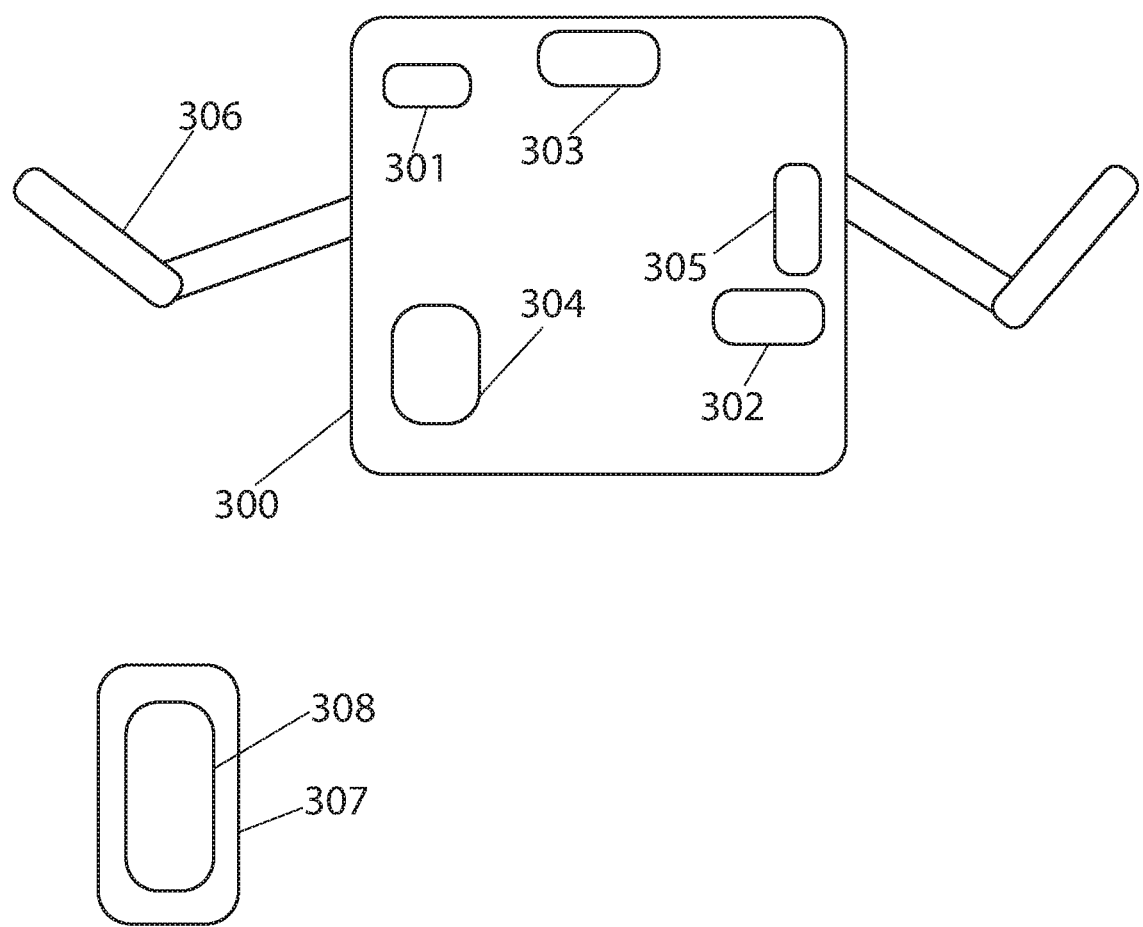
FIG. 3 illustrates an example of a tennis playing robotic device and an application of a communication device paired with the robotic device according to some embodiments by which the techniques described herein may be implemented.

FIG. 3 illustrates a top view of an example of a tennis playing robotic device 300 with a processor 301, memory 302, sensors 303, actuator 304, battery 305 and arms 306. In some embodiments, the robotic device 300 may include the features of a robotic device described herein. In some embodiments, program code stored in the memory 302 and executed by the processor 301 may effectuate the operations described herein. Some embodiments additionally include communication device 307 (e.g., mobile device, laptop, remote control, specialized computer, desktop computer, tablet, etc.) having a touchscreen 308 and that executes an application by which the user interfaces with robotic device 300. In some embodiments, processor 301 and memory 302 implement some of the functionality described herein. In some embodiments, a user may provide instructions to robotic device 300 to perform certain tasks or to use certain settings at certain times or in certain areas of the environment using the application of communication device 307 wirelessly paired with robotic device 300.

The functionality provided by each of the components may be provided by software or hardware modules that are differently organized than is presently depicted. For example, such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, the applicant has grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but, to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

The present techniques will be better understood with reference to the following enumerated embodiments:

1. A tennis playing robotic device comprising: a chassis; a set of wheels; one or more motors to drive the wheels; one or more processors; one or more sensors; one or more arms pivotally coupled to the chassis; and one or more tennis rackets, each of the one or more tennis rackets being coupled to a terminal end of a corresponding arm of the one or more arms.
2. The tennis playing robotic device of embodiment 1, wherein each of the one or more arms comprises two or more links pivotally coupled.
3. The tennis playing robotic device of embodiments 1-2, wherein each of the one or more arms comprises a first link pivotally coupled to the robotic chassis on a first end, a second link pivotally coupled to a second end of the first link on a first end, and a third link pivotally coupled to a second end of the second link, and wherein a range of motion of the first link is an average range of motion of a human shoulder, a range of motion of the second link is an average range of motion of a human elbow, and a range of motion of the third link is an average range of motion of a human wrist.
4. The tennis playing robotic device of embodiments 1-3, wherein the one or more arms can retract and extend.
5. The tennis playing robotic device of embodiments 1-4, wherein the one or more tennis rackets are detachable.
6. The tennis playing robotic device of embodiments 1-5, wherein the tennis playing robotic device is configured to hit a tennis ball with the one or more tennis rackets coupled to each of the corresponding arms of the one or more arms.
7. The tennis playing robotic device of embodiment 6, wherein the one or more processors actuate movement of each of the corresponding arms based on a position of the tennis ball, a position of an opponent and a target location on an opposing end of a tennis court.
8. The tennis playing robotic device of embodiment 7, wherein the target location on the opposing end of the tennis court depends on a difficulty level setting of the tennis playing robotic device.
9. The tennis playing robotic device of embodiment 7, wherein the one or more processors infer the position of the tennis ball and the position of the opponent using data collected by the one or more sensors.
10. The tennis playing robotic device of embodiment 7, wherein the one or more processors can adjust a speed of movement of each of the corresponding arms of the one or more arms.
11. The tennis playing robotic device of embodiment 10, wherein the speed of movement of each of the corresponding arms of the one or more arms depends on the difficulty level setting of the tennis playing robotic device.
12. The tennis playing robotic device of embodiment 6, wherein the one or more processors actuate movement of the tennis playing robotic device based on the position of the tennis ball.
13. The tennis playing robotic device of embodiment 6, wherein the tennis playing robotic device is configured to hit the tennis ball with the one or more tennis rackets at a predetermined success rate.
14. The tennis playing robotic device of embodiment 13, wherein the predetermined success rate depends on the difficulty level setting of the tennis playing robotic device.
15. The tennis playing robotic device of embodiments 1-14, wherein one or more settings of the tennis playing robotic device are adjustable.
16. The tennis playing robotic device of embodiment 15, wherein the one or more settings includes at least one of: a difficulty level, a maximum or range of or particular tennis ball hitting speed, a maximum or range of or particular driving speed, a type of tennis match, a maximum or range of or particular tennis ball serving speed, a schedule, one or more tennis ball hitting directions, one or more tennis ball serving directions, one or more positions, and a success rate.
17. The tennis playing robotic device of embodiment 15, wherein the one or more settings are adjusted using at least one of: a built-in user interface of the tennis playing robotic device, a remote control, and an application of a communication device paired with the tennis playing robotic device.
18. The tennis playing robotic device of embodiment 15, wherein the one or more processors autonomously adjusts the one or more settings of the tennis playing robotic device and uses a machine learning method to determine optimal one or more settings of the tennis playing robotic device for a particular user.
19. The tennis playing robotic device of embodiment 18, wherein the machine learning method comprises a Markov Decision Process and the optimal one or more settings of the tennis playing robotic device result in at least one of: a particular success rate of the tennis playing robotic device, a maximum success rate of the tennis playing robotic device, a particular success rate of the opponent, and a maximum success rate of the opponent.
20. The tennis playing robotic device of embodiments 1-19 further comprising one or more tennis ball launchers with adjustable tennis ball launching speed and tennis ball launching direction.

The invention claimed is:
1. A tennis playing robotic device comprising:
a chassis;
a set of wheels;

one or more motors to drive the wheels;
one or more processors;
one or more sensors;
one or more arms pivotally coupled to the chassis; and
one or more tennis rackets, each of the one or more tennis rackets being coupled to a terminal end of a corresponding arm of the one or more arms, wherein:
the tennis playing robotic device is configured to hit a tennis ball with the one or more tennis rackets coupled to each of the corresponding arms of the one or more arms; and
the one or more processors actuate movement of the tennis playing robotic device based on the position of the tennis ball.

2. The tennis playing robotic device of claim 1, wherein each of the one or more arms comprises two or more links pivotally coupled.

3. The tennis playing robotic device of claim 1, wherein each of the one or more arms comprises a first link pivotally coupled to the robotic chassis on a first end, a second link pivotally coupled to a second end of the first link on a first end, and a third link pivotally coupled to a second end of the second link, and wherein a range of motion of the first link is an average range of motion of a human shoulder, a range of motion of the second link is an average range of motion of a human elbow, and a range of motion of the third link is an average range of motion of a human wrist.

4. The tennis playing robotic device of claim 1, wherein the one or more arms can retract and extend.

5. The tennis playing robotic device of claim 1, wherein the one or more tennis rackets are detachable.

6. The tennis playing robotic device of claim 1, wherein the one or more processors actuate movement of each of the corresponding arms based on a position of the tennis ball, a position of an opponent and a target location on an opposing end of a tennis court.

7. The tennis playing robotic device of claim 6, wherein the target location on the opposing end of the tennis court depends on a difficulty level setting of the tennis playing robotic device.

8. The tennis playing robotic device of claim 6, wherein the one or more processors infer the position of the tennis ball and the position of the opponent using data collected by the one or more sensors.

9. The tennis playing robotic device of claim 6, wherein the one or more processors can adjust a speed of movement of each of the corresponding arms of the one or more arms.

10. The tennis playing robotic device of claim 9, wherein the speed of movement of each of the corresponding arms of the one or more arms depends on the difficulty level setting of the tennis playing robotic device.

11. The tennis playing robotic device of claim 1, wherein the tennis playing robotic device is configured to hit the tennis ball with the one or more tennis rackets at a predetermined success rate.

12. The tennis playing robotic device of claim 11, wherein the predetermined success rate depends on the difficulty level setting of the tennis playing robotic device.

13. The tennis playing robotic device of claim 1, wherein one or more settings of the tennis playing robotic device are adjustable.

14. The tennis playing robotic device of claim 13, wherein the one or more settings includes at least one of: a difficulty level, a maximum or a range of or particular tennis ball hitting speed, a maximum or range of or particular driving speed, a type of tennis match, a maximum or range of or particular tennis ball serving speed, a schedule, one or more tennis ball hitting directions, one or more tennis ball serving directions, one or more positions, and a success rate.

15. The tennis playing robotic device of claim 13, wherein the one or more settings are adjusted using at least one of: a built-in user interface of the tennis playing robotic device, a remote control, and an application of a communication device paired with the tennis playing robotic device.

16. The tennis playing robotic device of claim 13, wherein the one or more processors autonomously adjusts the one or more settings of the tennis playing robotic device and uses a machine learning method to determine optimal one or more settings of the tennis playing robotic device for a particular user.

17. The tennis playing robotic device of claim 16, wherein the machine learning method comprises a Markov Decision Process and the optimal one or more settings of the tennis playing robotic device result in at least one of: a particular success rate of the tennis playing robotic device, a maximum success rate of the tennis playing robotic device, a particular success rate of the opponent, and a maximum success rate of the opponent.

18. The tennis playing robotic device of claim 1 further comprising one or more tennis ball launchers with adjustable tennis ball launching speed and tennis ball launching direction.

19. The tennis playing robotic device of claim 1, wherein the tennis playing robotic device is configured to:
generate a map an environment of the tennis playing robotic device;
localize the tennis playing robotic device; and
generate a movement path of the tennis playing robotic device.

20. The tennis playing robotic device of claim 1, wherein the tennis playing robotic device collaborates with one or more robotic devices.

* * * * *